United States Patent [19]

Warhol

[11] Patent Number: 4,490,205
[45] Date of Patent: Dec. 25, 1984

[54] APPARATUS AND METHOD FOR SHAPING FLEXIBLE MATERIAL ON A FORM

[76] Inventor: John G. Warhol, 14041 Vernon Ave., Oak Park, Mich. 48237

[21] Appl. No.: 163,726

[22] Filed: Jun. 27, 1980

Related U.S. Application Data

[63] Continuation-in-part of Ser. No. 909,395, May 25, 1978, abandoned.

[51] Int. Cl.³ .................. B32B 31/04; B60J 7/00
[52] U.S. Cl. .................. 156/351; 156/500;
156/359; 156/366; 156/494; 156/499; 156/475;
156/71; 156/212; 156/224; 156/229; 156/245;
156/267; 156/312; 264/32; 264/161; 264/274;
264/275; 264/292; 264/264; 264/257; 264/294;
264/324; 425/143; 425/160; 425/340; 425/383;
425/502; 296/31 P; 296/210
[58] Field of Search ............ 156/212, 222, 224, 221,
156/229, 245, 267, 312, 71, 351, 500, 359, 366,
494, 499, 475, 477.1; 264/32, 161, 274, 275, 292,
264, 257, 295, 324, 335; 425/143, 160, 340, 383,
501-502; 296/31 P, 31 R, 210

[56] References Cited

U.S. PATENT DOCUMENTS

| | | | |
|---|---|---|---|
| 2,455,055 | 11/1948 | Gray | 425/383 |
| 2,919,218 | 12/1959 | Le May | 156/212 |
| 3,044,117 | 7/1962 | Alspach et al. | 425/340 |
| 3,429,006 | 2/1969 | Mattimoe et al. | 425/383 |
| 3,686,051 | 8/1972 | Samuel et al. | 156/212 |
| 3,878,010 | 4/1975 | Zammit | 156/71 |
| 3,935,353 | 1/1976 | Doerfling et al. | 296/137 R |
| 4,029,532 | 6/1977 | Warhol et al. | 156/71 |
| 4,217,079 | 8/1980 | Smith et al. | 425/160 |

FOREIGN PATENT DOCUMENTS 469052 7/1937 United Kingdom .
477467 12/1937 United Kingdom .

Primary Examiner—Lois E. Boland
Attorney, Agent, or Firm—Emrich & Dithmar

[57] ABSTRACT

Apparatus is provided for preforming automobile rooftop coverings made of flexible sheets of vinyl and the like. The flexible material is treated with a thermosetting composition and then applied to an automobile rooftop form. Pneumatic tensioning means are attached to the edges of the material at a plurality of spaced-apart points to tension it over the form to a predetermined orientation and shape while maintaining the forces on the material substantially in equilibrium. The material is heated to set the thermosetting composition. Clamping means lightly engage the material to hold it in the predetermined shape until the setting temperature is reached and then firmly engage it to form maginal flanges thereon. The shaped material is then removed from the form by a vacuum carrier and then cooled and trimmed in the carrier.

A pressure-sensitive adhesive and release liner may also be applied to the material so that after it is shaped it can be directly adhesively secured to an automobile rooftop. Systems including plural forms and a discharge carrier movable among the forms for removing the shaped material therefrom to a discharge position, and a carrousel arrangement of a plurality of forms movable on a conveyor through a plurality of processing stations are also disclosed.

22 Claims, 11 Drawing Figures

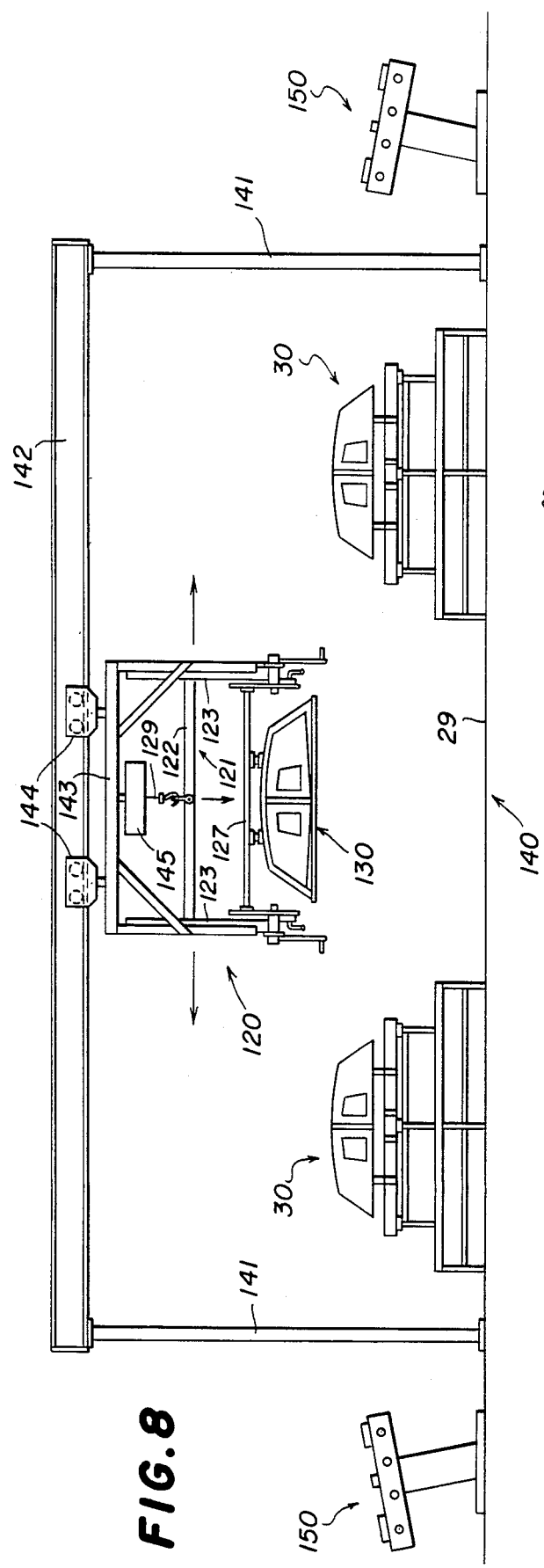
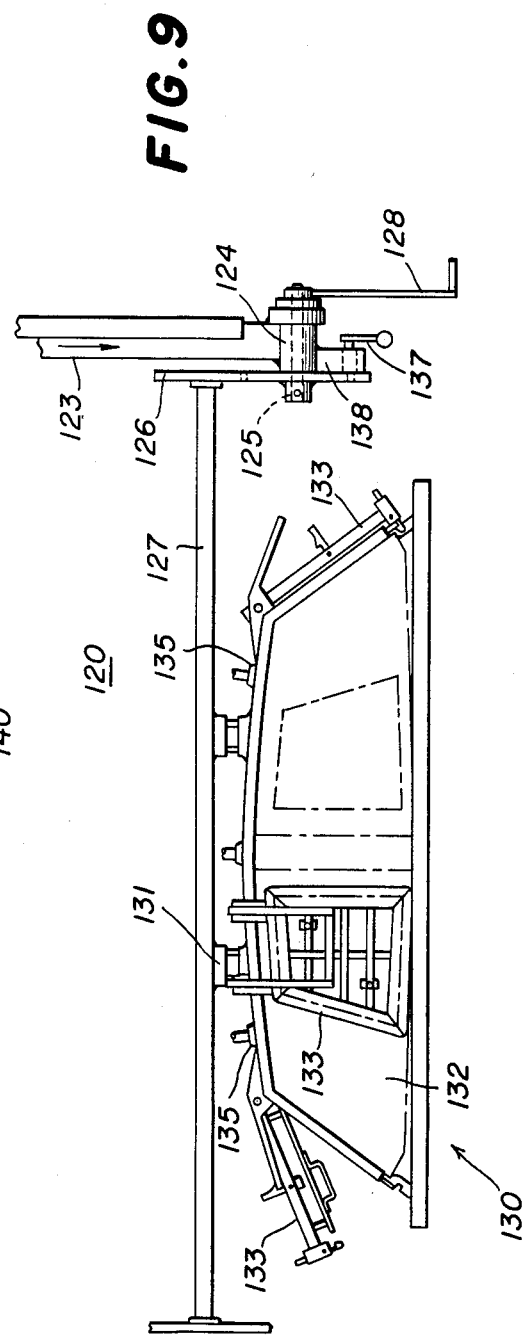
FIG. 8
FIG. 9

4,490,205

APPARATUS AND METHOD FOR SHAPING FLEXIBLE MATERIAL ON A FORM

REFERENCE TO RELATED APPLICATION

This application is a continuation-in-part of application Ser. No. 909,395, filed May 25, 1978 now abandoned.

BACKGROUND OF THE INVENTION

This invention relates to means for converting flexible material to a relatively rigid state in a predetermined orientation and shape. In particular, this invention has application to pre-shaping automobile rooftop coverings made of vinyl, plastic, leather or the like.

Many automobiles are provided with partial or complete decorative rooftop coverings formed of sheet vinyl, plastic or the like. The covering material usually is a prefabricated flexible composite material comprising a relatively thin outer layer of decorative material and an inner layer of fiber material such as felt or the like which provides a cushioning effect and absorbs a suitable adhesive for permanently adhesively securing the rooftop covering to the smooth, rigid outer rooftop surface of an automobile.

Typically, the rooftop covering material is precut in a blank of approximately the proper size and shape for the particular application. Installation of this blank on the automobile rooftop is typically done on the automobile assembly line and is an extremely costly and time-consuming operation. Once the adhesive has been applied to the covering material and to the automobile rooftop, movement of the material on the rooftop is difficult and yet it must be done accurately and precisely and without damage to the material. In particular, a serious problem with grained vinyl materials is creasing of the material or contacting it in a way which would mar or obliterate the grain. Thus, a number of men must simultaneously work the material onto the automobile rooftop to insure proper positioning without wrinkling or creasing the material. Because of the difficult and time-consuming nature of the installation operation, the complete installation, including application of adhesive, fitting of the covering material on the rooftop and final trimming occupies 25 to 30 car lengths of expensive real estate on the final automobile assembly line, and can require the services of as many as 110 men. Even then, when the job is all done, the rooftop covering is susceptible to expansion or shrinkage of as much as one-quarter inch from exposure to temperature extremes of very hot and cold weather.

SUMMARY OF THE INVENTION

In accordance with the present invention, means are provided for preconditioning the automobile rooftop covering so as to avoid the disadvantages of the prior art installation procedure, while affording other structural and functional advantages.

More specifically, it is a general object of the present invention to provide an apparatus and method for preshaping the rooftop covering to the same size and three-dimensional shape as the automobile rooftop to which it is to be applied.

It is another object of this invention to provide means for shaping a sheet of flexible material on a form and conditioning the material to retain that shape.

In connection with the foregoing object, it is an object of this invention to provide a method of treating the flexible material with a thermosetting composition, shaping the treated flexible material on a form and heating it on the form to set the thermosetting composition.

In connection with the foregoing objects, another object of this invention is the provision of controlled heating means and sensing means for de-energizing the heating means for a predetermined time when the flexible material has reached a temperature sufficient to set the thermosetting composition.

It is another object of this invention to provide means for shaping a flexible material on a form and then clamping or holding it in the predetermined shape on the form.

It is still another object of this invention to provide an apparatus for pre-shaping the flexible material on a form, which apparatus is characterized by a modular construction including a support frame having the form and associated clamping means mounted thereon, the entire support frame and associated equipment mounted thereon being removable as a unit from an apparatus base.

It is another object of this invention to provide a system including multiple forms to increase the rate of production of pre-shaped material.

These and other objects of the invention are attained by providing apparatus for applying and shaping on a form a prefabricated material including a thermosetting composition, the apparatus comprising means for tensioning the associated material on the form to a predetermined orientation and shape, heating means disposed for heating the associated material on the form to a predetermined temperature sufficient to insure setting of the thermosetting composition and the material in the predetermined shape, sensing means disposed closely adjacent to the prefabricated material for detecting the temperature thereof while it is in on the form, control means coupled to the sensing means and to the heating means and responsive to the sensing means for de-energizing the heating means when the prefabricated material has reached the predetermined temperature, and clamping means associated with the form and movable among an open condition out of engagement with the associated material and first and second clamping conditions, the clamping means in the first clamping condition thereof lightly engaging the associated material on the form with a force sufficient securely to hold the prefabricated material in its predetermined orientation and shape but insufficient permanently to crease the prefabricated material, the clamping means in the second clamping condition thereof tightly engaging the associated material on the form with a force sufficient permanently to crease the prefabricated material to form marginal flanges thereon.

Further features of the invention pertain to the particular arrangement of the steps of the method and the parts of the apparatus whereby the above-outlined and additional operating features thereof are attained.

The invention, both as to its organization and method of operation, together with further objects and advantages thereof, will best be understood by reference to the following specification taken in connection with the accompanying drawings.

BRIEF DESCRIPTION OF THE DRAWINGS

FIG. 8 is a side elevational view of a system incorporating two fabrication machines constructed in accordance with the present invention and a removal fixture for removing completed rooftop coverings from the machines and conveying them to a trimming station;

FIG. 9 is an enlarged fragmentary side elevational view of the removal fixture of FIG. 8;

DESCRIPTION OF THE PREFERRED EMBODIMENTS

Figure 5:
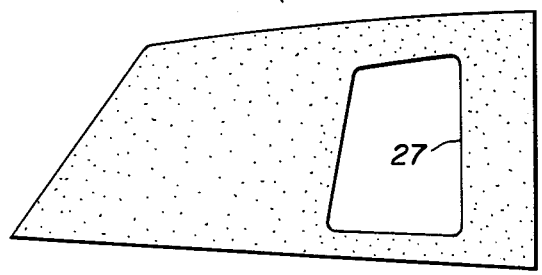
FIG. 5 is a side elevational view of a finished automobile half-top covering constructed in accordance with the method and apparatus of the present invention.

Referring now to FIGS. 1 through 4 of the drawings, there is illustrated a machine, generally designated by the numeral 30, for forming a prefabricated automobile rooftop covering, generally designated by the numeral 20 (see FIG. 5). The machine 30 is designed for simultaneous fabrication of two half-top automobile rooftop coverings of identical construction, but it will be understood that the machine could also be used for forming complete rooftop coverings one at a time, such complete coverings being illustrated in the parent application Ser. No. 909,395.

Figure 6:
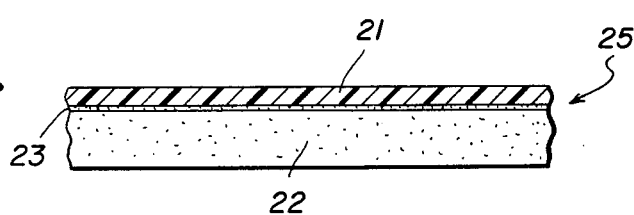
FIG. 6 is an enlarged fragmentary sectional view of the composite flexible material utilized for forming the rooftop covering with the present invention.

Referring to FIG. 6 of the drawings, the material utilized for forming the rooftop coverings 20 is a blank of composite flexible sheet material, generally designated by the numeral 25, which includes an outer sheet 21 of decorative material such as vinyl, leather or the like, and an inner sheet 22 of padding or cushioning material such as felt, which is secured to the decorative sheet 21, as by a layer of suitable adhesive 23. The adhesive 23 is a thermosetting composition which is applied to the felt layer 22 and to the decorative layer 21 in liquid form, as by spraying at room temperature, the adhesive 23 being designed to set at a temperature in the range of from about 250 degrees F. to about 300 degrees F.

The sheets 21 and 22 are precut to approximately the desired size and shape of the rooftop covering to be formed, but with a predetermined amount of excess marginal material for a purpose to be explained more fully below. When adhered together, the sheets 21 and 22 form a composite material blank for application to the machine 30 for fabrication of the rooftop covering 20. The blank 25 is provided with a plurality of spaced-apart apertures along the front edge thereof, and may be provided along the margins thereof with suitable markings, all to facilitate locating on an attachment to the machine 30, as will be explained more fully below. The precut blank 25 is typically provided with a plurality of window cutouts 27 (see FIGS. 1 and 5), the half-top blanks for fabrication on the preferred embodiment of the invention described herein having two side window cutouts and a rear window cutout.

Figure 7:
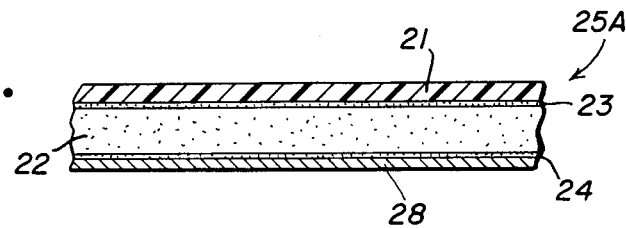
FIG. 7 is a view similar to FIG. 6, illustrating a modified form of the flexible material of this invention.

In FIG. 7 there is illustrated an alternative form of the composite flexible material blank, generally designated by the numeral 25A, which includes the outer and inner sheets 21 and 22 secured together by the thermosetting adhesive 23 in exactly the same manner as the composite material 25, but additionally includes a layer of pressure-sensitive adhesive 24 on the other surface of the cushioning sheet 22, the adhesive layer 24 being preferably covered by a peelable release liner 28 formed of a suitable material such as Mylar. The adhesive 24 is of a type which is unaffected by temperatures of the order of magnitude required for setting the thermosetting adhesive 23.

Referring again in particular to FIGS. 1 through 4 of the drawings, the machine 30 includes a base platform, generally designated by the numeral 31, adapted to be supported upon the floor 29 or other underlying support surface and including a plurality of upstanding legs 32 interconnected by a plurality of brace members 33 and supporting thereon a flat rectangular deck 34, which may be of any suitable construction but is preferably formed of steel mesh decking. Mounted upon the base platform 31 is a framework, generally designated by the numeral 35, which includes a plurality of upstanding legs 36, each having the lower end thereof fixedly secured to the deck 34 and being provided at the upper end thereof with a mounting pedestal 37, the legs 36 being interconnected by a plurality of substantially horizontally-extending beams 38 and cross members 39.

Mounted on the framework 35 is a support frame, generally designated by the numeral 40, which includes a plurality of longitudinally-extending hollow beams 41 substantially rectangular in transverse cross section, and interconnected by a plurality of transversely-extending hollow beams 42 substantially rectangular in transverse cross section. Fixedly secured to the bottom of the support frame 40 is a plurality of mounting pads 43 adapted to be respectively received on the pedestals 37 and removably secured thereto by bolts 44 or the like. Extending upwardly from the top of the support frame 40 is a plurality of lamp supports 45 and rooftop form supports 46 (see FIGS. 2 and 3).

Mounted upon the support frame 40 is an automobile rooftop form, generally designated by the numeral 50, which comprises a shell preferably formed of a suitable metal such as steel, and which is shaped identically to the rooftop of the particular model of automobile for which the rooftop covering 20 is to be formed. The rooftop form 50 may be a complete top form or, as illustrated in the drawings, may be in the shape of two identical half top forms with the front edges thereof abutting, these halves being designated by the numeral 51. Fixedly secured to the underside of the form 50 and extending downwardly therefrom is a plurality of spaced-apart mounting legs 52, each provided at the lower end thereof with an attachment pad 53 adapted for mating engagement with a corresponding one of the rooftop form supports 46 on the support frame 40, for attachment thereto by suitable fasteners such as bolts 47 or the like. The rooftop form 50 has window openings 55 formed therein, each of these openings being bounded by a peripheral recessed step 56 to provide a bearing surface for a purpose to be explained more fully below.

Typically, the rooftop form 50 will have at least one rear window opening and two side window openings, respectively formed on the opposite sides of the form. In the embodiment illustrated, each of the halves 51 of the rooftop form 50 is provided with this arrangement of rear and side window openings. It will be appreciated that the number, size and position of the window openings will vary depending upon the particular model of automobile for which a rooftop covering is being fabricated. Extending across the top of the rooftop form 50 midway between the opposite ends thereof is a metal band 57 provided with a plurality of spaced-apart and outwardly projecting pins 58 thereon. Extending across each of the window openings in the rooftop form 50 is a substantially horizontal keeper bar 59.

Two substantially identically constructed hold-down assemblies, each generally designated by the numeral 60, are respectively mounted on the support frame 40 at the opposite sides thereof midway between the ends thereof. Each of the hold-down assemblies 60 includes an elongated arm 61 shaped generally to conform to the curvature of the rooftop form 50 and extend halfway thereacross, the arm 61 being provided at the lower end thereof with a coupling member 62 pivotally mounted by means of a pivot pin 63 to a support block 64 on the support frame 40. Also pivotally mounted on the pin 63 is a pneumatic cylinder 65, the piston rod 66 of which is pivotally connected at the outer end thereof to one end of a link 67, the other end of which is secured to the coupling member 62. The arm 61 carries at the distal end thereof a heat sensor 68.

Figure 3:
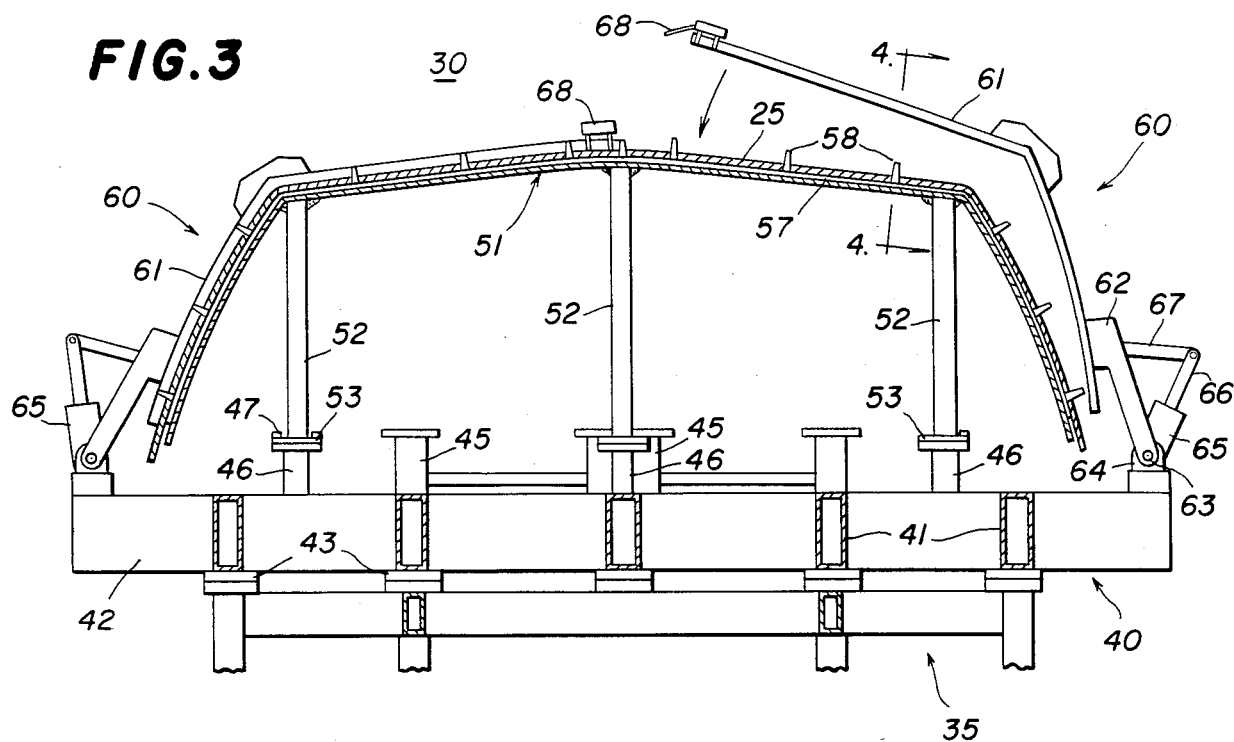
FIG. 3 is a fragmentary view in vertical section taken along the line 3—3 in FIG. 1, and illustrating the rooftop form support mechanism and the hold-down arm mechanism.
Figure 4:
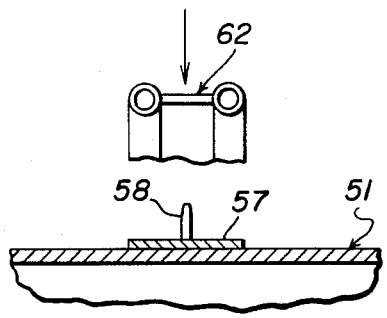
FIG. 4 is an enlarged fragmentary cross-sectional view taken along the line 4—4 in FIG. 3.

Each of the hold-down arms 61 is disposed in vertical alignment with the row of pins 58 on the metal band 57, and is movable between a hold-down position in engagement with the pins 58, as indicated by the position of the left-hand one of the hold-down assemblies 60, as viewed in FIG. 3, and a retracted position away from the rooftop form 50, the right-hand one of the hold-down assemblies 60, as viewed in FIG. 3, being illustrated midway between the retracted and hold-down positions. When the hold-down arms 61 are disposed in their hold-down positions, the sensors 68 thereof respectively overlie the two halves 51 of the rooftop form 50 for a purpose to be explained more fully below. It will be appreciated that manual means could also be provided for effecting movement of the hold-down assemblies 60 between the hold-down and retracted positions thereof.

Figure 1:
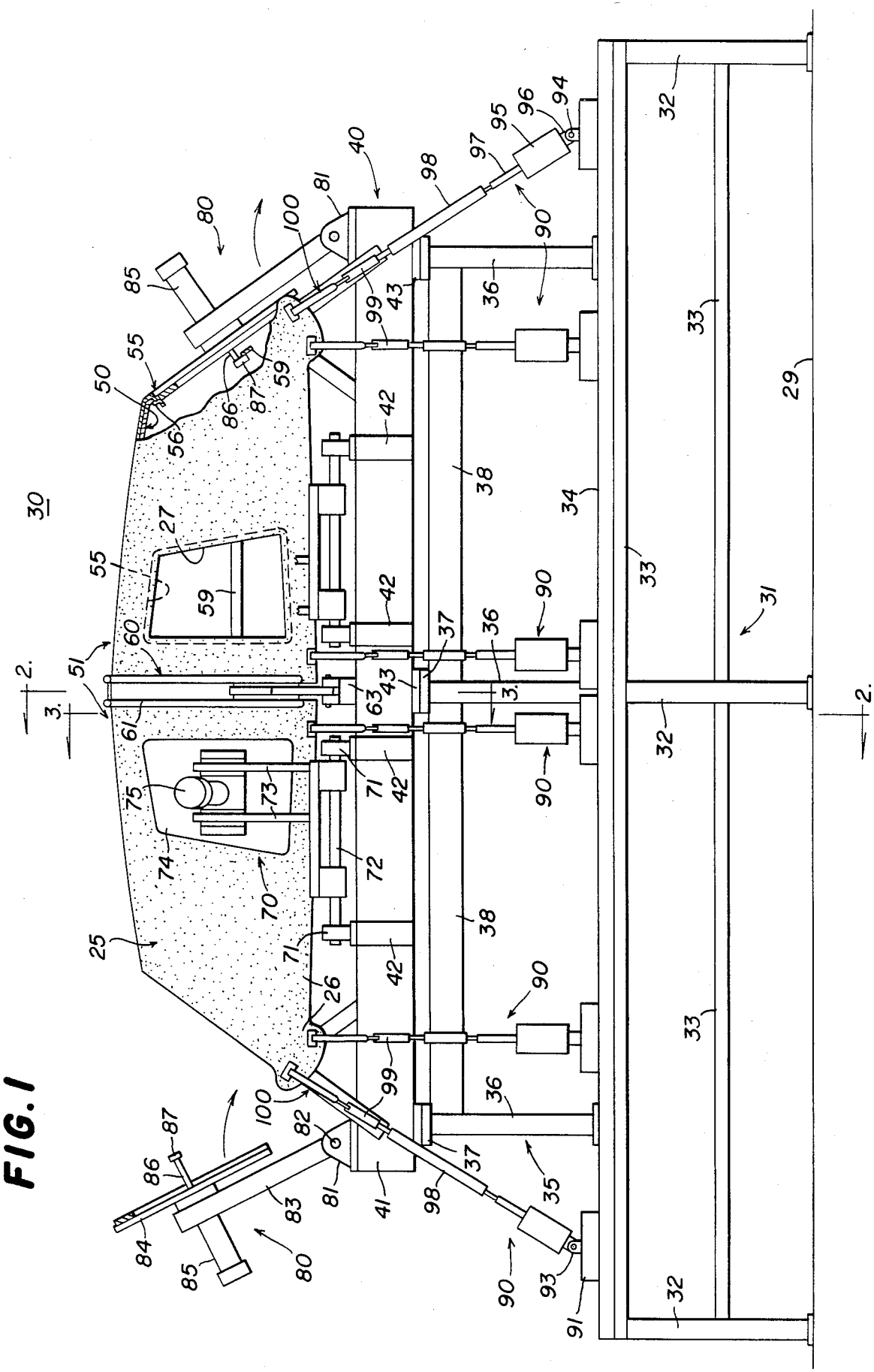
FIG. 1 is a side elevational view of a machine constructed in accordance with and embodying the features of the present invention, with portions broken away more clearly to show the underlying structure.
Figure 2:
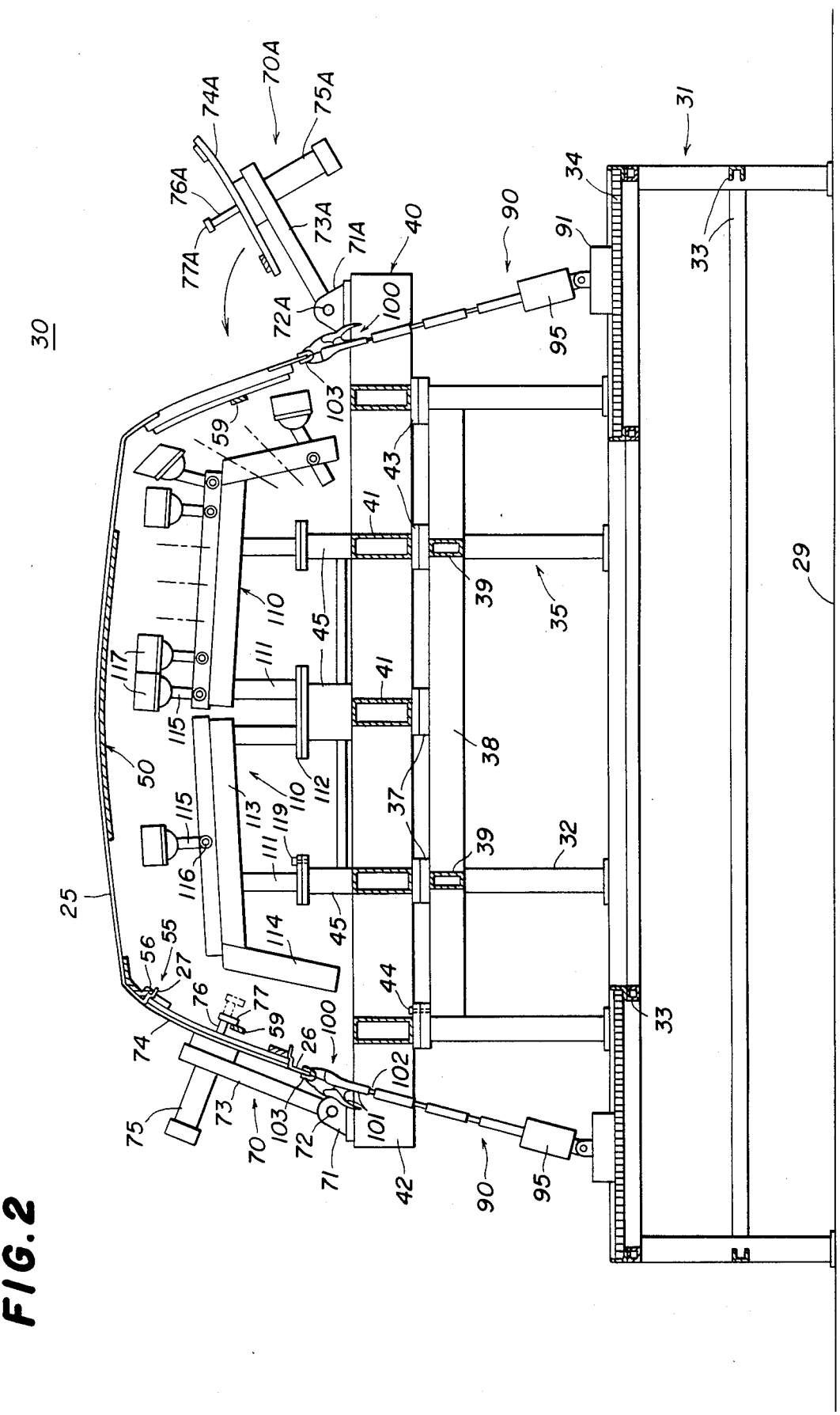
FIG. 2 is a view in vertical section taken along the line 2—2 in FIG. 1, with portions of the structure broken away, and illustrating the heat lamp assembly.

Referring now in particular to FIGS. 1 and 2 of the drawings, there are mounted on the support frame 40 for each half 51 of the rooftop form 50, a pair of side clamp assemblies generally designated by the numeral 70 and 70A, respectively disposed for cooperation with the side window openings on the opposite sides of the associated half 51 of the rooftop form 50, as viewed in FIG. 2. In FIG. 1 the side clamp assembly 70 of the pair for the right-hand half 51 of the rooftop form 50 has been broken away more clearly to show the side window opening 55. The pairs of side clamp assemblies for each half 51 of the rooftop form 50 are arranged as mirror images of each other, and the side clamp assemblies 70 and 70A of each pair are formed as mirror images of each other, wherefore only one side clamp assembly will be described in detail.

More specifically, the side clamp assembly 70 includes a pair of spaced-apart bearing blocks 71 secured to the support frame 40 and rotatably supporting therebetween a shaft 72. Fixedly coupled to the shaft 72 by a suitable mechanism are two upstanding spaced-apart arms 73 having fixedly secured to the upper end thereof a clamping plate 74 shaped for mating engagement in the associated window opening 55 in the rooftop form 50. Fixedly secured to the outer surface of the clamping plate 74 is a pneumatic cylinder 75, the piston rod 76 of which extends through a complementary opening in the clamping plate 74 and is provided at the distal end thereof with a latch member 77.

In operation, the side clamp assemblies 70 and 70A are movable between an open position, illustrated at the right-hand side of FIG. 2, and a closed position, illustrated at the left-hand side of FIG. 2, and while in the closed position, they are movable between first and second clamping conditions. When disposed in the closed position, the clamping plate 74 fits within the window opening 55 of the rooftop form 50, the peripheral margins of the clamping 74 being positioned for bearing against the step 56 around the entire perimeter of the window opening 55. When the side clamp assembly 70 is disposed in its closed position, and the piston rod 76 thereof is extended, the latch member 77 extends inwardly behind the keeper bar 79 across the window opening 55. The cylinder 75 is preferably provided with a mechanism for rotating the piston rod 76 about its axis, thereby to move the latch member 77 to a latching position, illustrated in FIG. 2 extending downwardly behind the keeper bar 59, so that when the piston rod 76 is retracted, the latch member 77 will engage against the rear side of the keeper bar 59 to hold the clamp assembly in its closed position and pull it to its clamping conditions.

In like manner, there are provided two rear clamp assemblies, each generally designated by the numeral 70, there being one for each half 51 of the rooftop form 50, the rear clamp assemblies 80 being identically constructed, wherefore only one will be described in detail. Referring to FIG. 1, the rear clamp assembly 80 includes a pair of spaced-apart bearing blocks 81 (one shown) fixedly secured to the adjacent end of the support frame 40 and rotatably supporting therebetween a shaft 82. Fixedly secured to the shaft 82 by suitable mechanism are a pair of upstanding arms 83 (one shown), having fixedly secured thereto at the upper end thereof an elongated clamping plate 80 dimensioned for mating engagement in the rear window opening 55 in the rooftop form 50. Also fixedly secured to the outer surface of the clamping plate 80 are two pneumatic cylinders 85 (one shown), the piston rods 86 of which extend through complementary openings in the clamping plate 84 and are respectively provided at the distal ends thereof with latch members 87.

In operation, the rear clamp assembly 80 operates in the same manner as the side clamp assemblies 70 and 70A, being movable between an open position illustrated at the left-hand end of FIG. 1 and a closed position illustrated at the right-hand end of FIG. 1. When the piston rod 86 is extended and the rear clamp assembly 80 is in its closed position, the latch member 87 projects inwardly of the associated keeper bar 59 and is engageable with the rear side thereof upon ninety degree rotation of the piston rod 86 about its axis for latching the rear clamp assembly 80 in its closed position and pulling it to first and second clamping conditions.

The machine 30 also includes a plurality of tension assemblies, each generally designated by the numeral 90. In the embodiment illustrated in the drawings, twelve of the tension assemblies 90 are provided, two at the rear end and two at each side of each half 51 of the rooftop form 50. The tension assemblies 90 are substantially identical in construction, wherefore only one will be described in detail. Each tension assembly 90 includes a mounting block 91 which is removably secured as by bolts to the deck 34 of the base platform 31. Carried by the mounting blocks 91 is a clevis 93 having pivotally coupled thereto as by a pivot pin 94 a coupling tongue 96 of a pneumatic cylinder 95. The piston rod 97 of the cylinder 95 is connected at the distal end thereof to an extension member 98, which is in turn coupled via a turnbuckle 99 to a gripping mechanism, generally designated by the numeral 100. The gripping mechanism 100 is preferably in the form of a modified pair of vise-grip pliers having handles 101 and a grip adjustment screw 102 which is coupled to the turnbuckle 99. The gripping mechanism 100 includes a pair of gripping jaws 103 adapted for gripping engagement with the attachment margin 26 of the blank 25 when it is positioned on the rooftop form 50.

The machine 30 also includes a plurality of heating assemblies, each generally designated by the numeral 110, mounted on the support frame 40 beneath the rooftop form 50. Preferably, four of the heating assemblies 110 are provided, one for the left-hand side and one for the right-hand side of each half 51 of the rooftop form 50, the heating assemblies 110 preferably being substantially identical in construction, wherefore only one will be described in detail. Each heating assembly 110 includes a plurality of support legs 111, each provided at the lower end thereof with an attachment pad 112 adapted for mating engagement with an associated one of the lamp supports 45 on the support frame 40, for removable attachment thereto by suitable fasteners such as bolts 119 or the like. Interconnecting the legs 111 at the upper ends thereof are laterally-extending beams 113, each provided at the outer end thereof with a depending support member 114. Preferably, the beams 113 are mounted for sliding lateral movement with respect to the legs 111 for adjustment to adapt to different sizes and shapes of rooftop forms. Mounted on the beams 113 and support members 114 and projecting outwardly therefrom is a plurality of support arms 115, each carrying at the outer end thereof a heat lamp 117, each of the support arms 115 also being preferably mounted for sliding movement inwardly and outwardly for adjustment of the position thereof.

Referring now also to FIGS. 8 and 9 of the drawings, there is illustrated a removal fixture, generally designated by the numeral 120, for removing finished blanks from the machine 30. The removal fixture 120 includes a frame, generally designated by the numeral 121, which includes a crossbar 122, the opposite ends of which are respectively fixedly secured to parallel uprights 123. The lower ends of the uprights 123 are respectively fixedly secured to coaxially aligned bushings 124. Respectively rotatably mounted in the bushings 124 are stub shafts 125, the inner ends of which are respectively fixedly secured to end plates 126. Extending between the end plates 126 and fixedly secured thereto are a pair of parallel crossbars 127 (one shown). The outer end of each of the stub shafts 125 has fixedly secured thereto a crank arm 128. Coupled to the crossbar 122 midway between the ends thereof is a hoist chain or cable 129 for raising and lowering the removal fixture 120.

A cradle, generally designated by the numeral 130 and substantially in the shape of the rooftop form 50, is fixedly mounted on the crossbars 127 by support members 131. The cradle 130 includes a shell 132 which is substantially the same shape as the rooftop form 50, and which is provided with a plurality of window openings therein respectively corresponding to the window openings 55 in the rooftop form 50. Pivotally mounted on the cradle 130 are window closure members 133, respectively associated with the window openings and each movable between an open position and a closed position disposed in the associated window opening. Fixedly secured to each of the bushings 124 and extending downwardly therefrom is a keeper plate 138 having a bore therethrough disposed for coaxial alignment with corresponding bores through the end plates 126 for receiving therethrough complementary latch pins 137 securely to lock the cradle 130 in position. Mounted on the shell 132 is a plurality of suction devices 135, each communicating with a complementary opening through the shell 132.

In FIG. 8 there is illustrated a system, generally designated by the numeral 140, including a removal fixture 120 in combination with two of the machines 30. More specifically, the system 140 includes a pair of upstanding frames 141 at spaced-apart points interconnected at the upper ends thereof by an elongated crossbeam 142 which provides a rail for a trolley mechanism 143, having a pair of roller assemblies 144 adapted for rolling engagement with flanges of the crossbeam 142. Supported by the trolley mechanism 143 is a hoist mechanism 145 coupled to the hoist chain or cable 129 for raising and lowering thereof. Mounted adjacent to each end of the system 140 are control consoles 150, there being two consoles 150 (one shown) for each of the machines 30.

In operation, the removal fixture is raised by the hoist mechanism 145 and is moved by the trolley mechanism 143 over one of the machines 30 after it has completed its operation on the blanks 25. The cradle 130 is latched in its inverted position, illustrated in FIGS. 8 and 9, so that it can be lowered over the rooftop form 50 in close fitting relationship therewith. A vacuum is then provided to the suction devices 135 for lifting the blanks 25 from the machine 30 and holding it within the cradle shell 132. Then the removal fixture 120 is raised and moved back to the center or discharge location between the machines 30, where it is lowered. The cradle 130 is then inverted by removing the latch pins 137, turning the crank handles 128 to rotate the stub shafts 125 through 180 degrees, and then reinserting the latch pins 137. The suction is then removed and the rooftop covering blanks rest in the cradle shell 132. The window closure members 133 are then latched closed and cooperate with the rest of the cradle shell 132 to form dies for guiding the trimming of the excess marginal material from the blanks 25. During the trimming operation a stream of cooling air may be directed onto the finished rooftop coverings 20, which are then removed from the cradle 130 after trimming and placed in inventory or transported to the assembly line. The removal fixture 120 is then reinverted and moved to the other machine 30 which, by this time, has completed its operation on the next blank 25.

Figure 10:
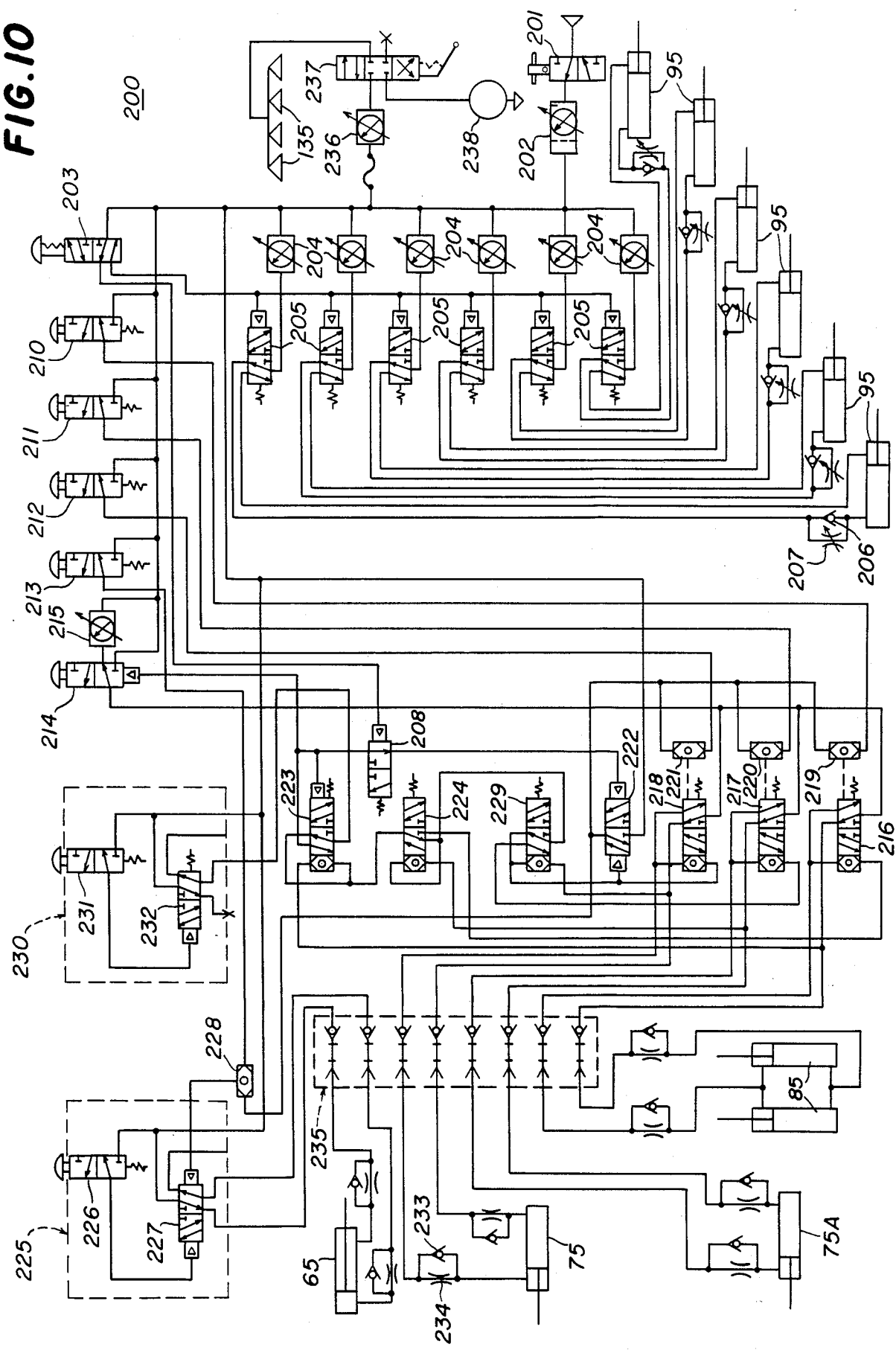
FIG. 10 is a schematic circuit diagram of the pneumatic control circuit of the present invention.

Referring now to FIG. 10 of the drawings, there is illustrated a fluid control circuit, generally designated by the numeral 200, for controlling the operation of the machine 30. While, in the preferred embodiment of the invention, the machine 30 is pneumatically operated, it will be understood that hydraulic operation could also be used, without substantial change in the control circuit 200. Preferably, two identical control circuits 200 are provided, one for each half 51 of the rooftop form 50, these circuits being respectively operated from the control consoles 150 by two different operators.

The control circuit 200 includes a master ON-OFF valve 201 connected to an associated source of compressed air, and illustrated in its open or ON condition, in which the compressed air source is coupled through the valve 201 and a filter-lubricator-regulator assembly 202 to a manually-operated detent-type tension control valve 203. The source is also connected in parallel through a plurality of regulators 204 to a like plurality of spring-biased pilot-actuated valves 205, respectively associated with the cylinders 95 of the tension assemblies 90. More specifically, when each valve 205 is disposed in its normal condition illustrated in FIG. 10, the source air passes therethrough to the piston end of the associated cylinder 95 through a check 206 which is bypassed by a variable restriction 207, the rod end of the cylinder 95 being exhausted through the valve 205. Thus, the rods of the cylinders 95 are held extended when the valves 205 are in their normal conditions. The pilots of the valves 205 are all connected to exhaust through the valve 203 in its first detent condition illustrated in FIG. 10, in which condition the source is connected through the valve 203 to the pilot of a spring-biased pilot-actuated valve 208, the purpose of which will be explained more fully below.

The source is also connected to four spring-biased push-button-actuated control valves 210, 211, 212 and 213, and is also connected to a pilot-released push-button-actuated control valve 214 directly and through a regulator 215. In its normal condition illustrated in FIG. 10, the control valve 214 passes source air from the regulator 215 to each of three spring-biased pilot-actuated valves 216, 217 and 218, respectively provided with remote pilots 219, 220 and 221, which are respectively exhausted through the control valves 210, 211 and 212 in their normal positions illustrated in the drawing. The source is also connected to a pilot-actuated differential valve 222, one pilot of which is connected through the valve 208 in its actuated condition to the pilot of the control valve 214 and to one pilot of a spring-biased pilot-actuated valve 223, this pilot being connected to exhaust through the valve 223 in the actuated condition thereof illustrated in the drawing.

A control valve assembly, generally designated by the numeral 230, is connected through the valve 223 in its illustrated condition to the other pilot of the valve 223, and also through a spring-biased pilot-actuated valve 224 in its actuated condition illustrated in the drawing, to its pilot and thence through a spring-biased pilot-actuated valve 229 in its actuated condition illustrated in the drawing, to its pilot and thence to the other pilots of the valves 218 and 222. The source is connected through the valves 216, 217 and 218 respectively to pilots of the valves 223, 224 and 229.

A control valve assembly, generally designated by the numeral 225, includes a spring-biased push-button-actuated control valve 226 and a pilot-actuated differential valve 227. The source is connected to an internally blocked port of the control valve 226 in its normal condition illustrated in the drawing, the other port of this valve being connected to one pilot of the valve 227, the other pilot thereof being connected to a remote pilot 228, which is also connected to each of the remote pilots 219, 220 and 221 and to exhaust through the control valve 213 and the valve 222. The control valve assembly 230 includes a spring-biased, push-button-actuated control valve 231 and a spring-biased pilot-actuated valve 232. The source is connected to an internally blocked port of the control valve 231 in its normal position illustrated in the drawing, the other open port of the control valve 231 being connected to the pilot of the valve 232.

The valves 216, 217, 218 and 227 are all connected through a quick-disconnect coupler 235 to the portion of the pneumatic circuit formed by the support frame 40 and to the several cylinders mounted thereon. More specifically, the source passes through the valve 227 in its illustrated condition to the rod end of the associated hold-down cylinder 65, the piston end of which is exhausted through the valve 227. Source air also passes through the valves 218, 217 and 216 in their illustrated conditions, respectively to the piston ends of the left-hand, right-hand and rear clamping cylinders 75, 75A and 85, the rod ends of these cylinders being respectively exhausted through the valves 218, 217 and 216. The connection to each end of each of the cylinders 65, 75, 75A and 85 is through a check 233 bypassed with a fixed restriction 234.

The source is also connected through a regulator 236 to a lever-actuated three-position valve 237 which has a neutral or blocked condition illustrated in the drawing, and two closed conditions. In one closed condition, the valve 237 connects a vacuum pump 238 to the suction devices 135 on the cradle 130. In its other closed condition, the valve 237 connects the source to the suction devices 135.

For safety purposes, each of the control valve assemblies 225 and 230 may include a pair of palm-actuated valves, connected so that both valves must be actuated simultaneously in order to actuate the control valve assembly, thereby to prevent accidental operation of another valve with the free hand. But, for simplicity, each of the control valve assemblies 225 and 230 has been illustrated with a single push-button control valve 226 and 231.

Figure 11:
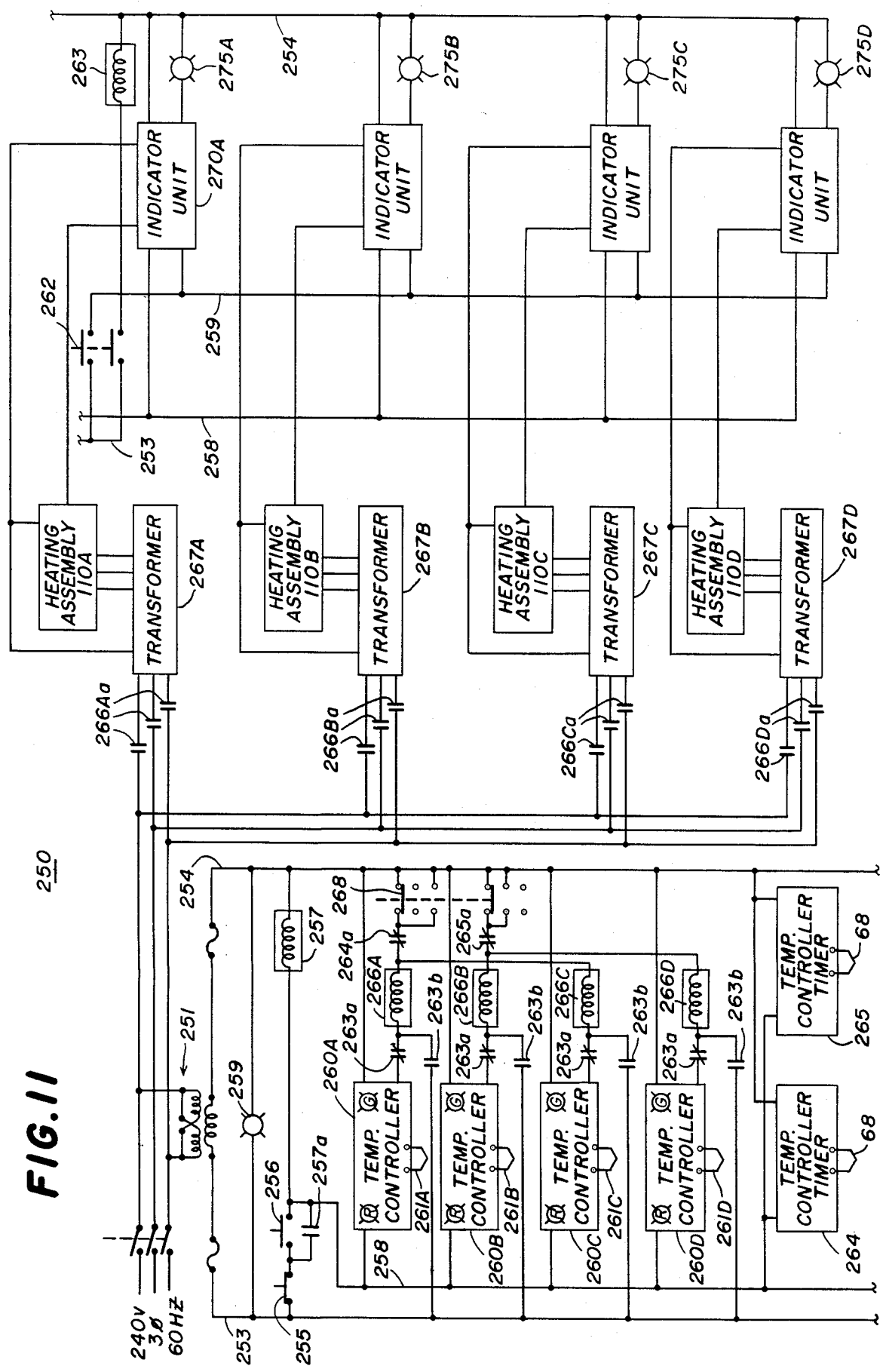
FIG. 11 is a schematic circuit diagram of the electrical control circuit of the present invention.

Referring now to FIG. 11 of the drawings, there is illustrated an electrical control circuit, generally designated by the numeral 250, for controlling the operation of the heating assemblies 110. The power from a 240-volt, 60 Hz, 3-phase supply is coupled through an input transformer 251, the secondary winding of which has the terminals thereof respectively connected to conductors 253 and 254. Connected in series across the conductors 253 and 254 are a normally-closed stop switch 255, a normally-open start switch 256 and the winding of a control relay 257, the normally-open contacts 257a of which are connected across the start switch 256. Connected across the secondary winding of the input transformer 251 is an indicator lamp 259 to indicate when the secondary winding is energized.

The junction between the start switch 256 and the winding of the control relay 257 is connected to a conductor 258. Connected in parallel across the conductors 258 and 254 are four temperature controllers 260A, 260B, 260C and 260D respectively associated with the four heating assemblies, which are respectively designated in FIG. 11 as 110A, 110B, 110C and 110D. The temperature controllers 260A–D are preferably solidstate and are identically constructed, being respectively provided with thermal sensors 261A-D coupled to an internal normally closed relay, and each having red and green indicator lamps thereon. There is also provided a double-pole single-throw lamp test switch 262, one pole of which is connected between the conductors 253 and a conductor 259, and the other pole of which is connected across the conductors 253 and 254 in series with the winding of a control relay 263. Also connected in parallel across the conductors 258 and 254 are two temperature controllers 264 and 265, which are similar to the temperature controllers 260A-D and are respectively associated with the heating assemblies 110 in the two halves 51 of the rooftop form 50, each being provided with one of the sensors 68 and an internal relay.

The temperature controller 260A is also connected to the conductor 254 through the series combination of one of the sets of normally-closed contacts 263a of the control relay 263, the winding of a lamp relay 266A, the normally-closed contacts 264a of the thermostatic relay of the temperature controller 264, and through two of the sets of contacts of a double-pole triple-throw selector switch 268. The temperature controller 260C is connected to the junction between the winding of the lamp relay 266A and the temperature controller relay contacts 264a by the series combination of another set of the control relay contacts 263a and the winding of a lamp relay 266C. The temperature controller 260B is also connected to the conductor 254 through the series combination of another set of the control relay contacts 263a, the winding of a lamp relay 266B, the normally-open contacts 265a of the thermostatic relay in the temperature controller 265, and a different two of the sets of contacts of the selector switch 268. The junction between the winding of the lamp relay 266B and the temperature controller contact 265a is connected to the temperature controller 260D by the series combination of a fourth set of the control relay contacts 263a and the winding of a lamp relay 266D. The junctions between the control relay contacts 263a and the windings of the lamp relays 266A-D are respectively connected to the conductor 254 through four normally-open sets of contacts 263b of the control relay 263.

The 3-phase, 240-volt source is connected to the four heating assemblies 110A-D, respectively through four normally-open sets of contacts 266Aa-266Da of the lamp relays 266A-D, and four transformer arrays 267A-D, the heating assemblies 110A-D being in turn respectively connected to four indicator units 270A-D. The indicator units 270A-D are identical and preferably each includes an ammeter for indicating the current through the associated heating assembly 110. The indicator units 270A-D are respectively connected across the conductors 253 and 254, and are also respectively connected in series with indicator lamps 75A-D across the conductors 259 and 254.

In operation, when the start switch 256 is closed, the relay 257 is energized, closing its contacts 257A, and thereby latching itself in the energized condition. The temperature controllers 260A-D, 264 and 265 are also energized via conductor 258. When the selector switch 268 is in its illustrated position, the conductor 254 is connected to both of the temperature controller relay contacts 264a and 265a, although it will be appreciated that either one of these relay contacts may be individually connected to the conductor 254 by appropriate selection of the position of the selector switch 268. When the temperature controllers 260A-D are energized, they energize the lamp relays 266 through the temperature controller internal relays, the control relay contacts 263, the temperature controller contacts 264a and 265a and the selector switch 268, thereby closing the lamp relay contacts 266Aa-Da and energizing the heating assemblies 110A-D. The current drawn by the heat lamps of the heating assemblies 110A-D is monitored by the ammeters in the indicator units 270A-D. Thus, if one or more of the lamps in a heating assembly 110 burns out, this condition will be indicated by a change in the current registered by the associated ammeter.

The thermal sensors 261A-D are respectively positioned adjacent to the inner surface of the rooftop form 50 in the four quadrants thereof corresponding to the heating assemblies 110A-D. The temperature controllers 260A-D are adjusted to maintain the temperature inside the rooftop form 50 in a predetermined narrow range, e.g., 340 degrees F.±10 degrees. When the temperature reaches this range, the internal relay of the temperature controller opens to de-energize the corresponding one of the lamp relays 266A-D, thereby de-energizing the corresponding one of the heating assemblies 110A-D. When the temperature falls below the predetermined range, the temperature controller relay recloses for re-energizing the associated heating assembly 110. When the internal relay of the temperature controller is closed, the green lamp thereof is illuminated, and when it is opened, the red lamp is illuminated. Thus, when the rooftop form 50 has reached the desired temperature range, the red and green lamps of the temperature controllers 260A-D will repeatedly cycle on and off as the desired temperature is maintained.

When the outer surfaces of the blanks 25 have reached a temperature which insures activation of the thermosetting adhesive 23, this fact is detected by the sensors 68 of the temperature controllers 264 and 265, the internal relays of which are energized for opening the contacts 264a and 265a, thereby de-energizing the lamp relays 266A-D and the heating assemblies 110A-D. Timing units in the temperature controllers 264 and 265 hold the relay contacts 264a and 265a open for a predetermined time period, preferably on the order of three or four minutes, and then allow them to reclose for re-energizing the heating assemblies 110A-D.

When it is desired to turn off the temperature controllers 260A-D, 264 and 265, the master stop switch 255 is opened, thereby de-energizing the latching relay 257. It will be appreciated that by closing the lamp test switch 262, the control relay 263 is energized, for opening the relay contact 263a and closing the contacts 263b, thereby bypassing the temperature controllers 260A-D for energizing the lamp relays 266A-D and the heating assemblies 110 for preliminary testing of the condition of the heating lamps, a satisfactory condition being indicated by illumination of the lamps 275A-D and a trouble condition being indicated by a failure of one or more of the lamps 275A-D to light.

With the aid of FIGS. 10 and 11, the operation of the machine 30 will now be described in detail. Initially, the temperature controllers 260A-D are energized and are controlling the heating assemblies 110 to maintain the desired temperature range inside the rooftop form 50. The hold-down assemblies 60, the side clamp assemblies 70 and 70A and the rear clamp assemblies 80 are all in their open positions, and the tension assemblies 90 are in their released conditions, with the piston rods 97 thereof fully extended. Two of the composite material blanks 25 are then manually placed on the two halves 51 of the rooftop form 50. More specifically, the front edges of the blanks 25 are placed over the steel band 57, with the pins 58 respectively received through the complementary locating holes in the blanks 25, the edges of the two blanks 25 being disposed in overlapping relationship over the pins 58. It will be appreciated that the blanks 25 are dimensioned so that the edges of the window cutouts 27 overlap the window openings 55 in the rooftop form 50 and the steps 56 thereof, and the attachment margins 26 are positioned for attachment to the tension assemblies 90.

The gripping mechanisms 100 of the tension assemblies 90 are all then securely attached to the margins 26 of the blanks 25 at predetermined locations, which are preferably marked on the blanks 25, the tension assemblies 90 being positioned on the deck 34 to facilitate accurate placement of the gripping mechanisms 100 and tensioning in the proper direction. Next, the side clamp assemblies 70 and 70A and the rear clamp assemblies 80 are moved to their closed positions, the piston rods 76, 76A and 86 all being in their fully extended positions, the piston rods then being rotated ninety degrees to bring the latch members 77, 77A and 87 into position for latching engagement with the keeper bars 59. At this time the clamping plates 74, 74A and 84 rest loosely in the window openings 55, and exert negligible clamping force. While in the disclosed embodiment the clamp assemblies 70, 70A and 80 are adapted for manual movement between the open and closed positions thereof, it will be appreciated that automatic drive means may be provided for this purpose, which is electrically or fluid-driven.

The master valves 201 have been closed to energize the pneumatic control circuits 200. As was explained above, the two pneumatic control circuits 200 are respectively disposed in the control consoles 150 and are identical, these control circuits being respectively adapted for controlling the two halves of the machine 30. Thus, the operation of only one control circuit 200 will be described in detail, it being understood that the same operations are substantially simultaneously being performed at the other control circuit 200 so that both halves of the machine 30 are being operated.

Initially, the operator manually closes the valve 226 in the control valve assembly 225, thereby providing source air to the pilot of the valve 227 and actuating it for passing source air to the piston end of the hold-down cylinder 65, and exhausting the rod end of the cylinder 65. Thus, the piston rod 66 of the hold-down cylinder 65 is extended for moving the hold-down arm 61 to its hold-down position for cooperation with the pins 58 to prevent accidental removal of the blanks 25 therefrom. When the hold-down arm 61 is in its hold-down position, the sensor 68 thereof will be disposed closely adjacent to but out of contact with the outer surface of the associated blank 25 for sensing the temperature thereof, it being understood that the two sensors 68 of the two hold-down assemblies 60 are respectively positioned for sensing the temperature of the two blanks 25. When the operator releases the valve 226, the hold-down cylinder 65 will remain extended until the valve 227 is actuated back to its original condition by application of source air to its other pilot through the remote pilot 228.

Next, the operator depresses the tension control valve 203 to its second detent position, thereby removing source air from the pilot of the valve 208 and allowing the latter valve to be returned to its normal condition, disconnecting the pilot of the valve 222 from the pilots of the valves 223 and 214. The actuation of the tension control valve 203 also provides source air simultaneously to the pilots of all of the valves 205, shifting them to their actuated conditions for supplying source air to the rod ends of the tensioning cylinders 95, and connecting the piston ends thereof to exhaust. Thus, the piston rods 96 of the cylinders 95 are all simultaneously retracted for pulling down on and tensioning the blanks 25. It will be appreciated that the regulators 204 are individually set so that each of the cylinders 95 will pull to its own specified tension, which is predetermined for the particular model of rooftop covering being fabricated. This is essential since, because of the particular shape and arrangement of each blank 25, and the nature of the material thereof, it must be tensioned at precisely determined locations and tensions in order to avoid creasing, misorientation or other damage to the material. Furthermore, it will be noted that the cylinders 95 pull gradually to their predetermined tensions, the rate of tensioning being controlled by the setting of the variable restrictions 207 in the exhaust lines. This is to prevent tearing of the blank 25 from sudden tensioning thereof.

It will be noted that source air, at a low pressure determined by the regulator 215, is provided through the valves 216, 217 and 218, respectively to the rod ends of the cylinders 85, 75A and 75 for holding the piston rods 86, 76A and 76 of the clamp assemblies 80, 70A and 70 in their extended positions, this low pressure source air also being provided through the valves 216, 217 and 218 respectively to the pilots of the valves 223, 224 and 229 for holding them in their actuated conditions illustrated in FIG. 10. After the tension assemblies 90 have been actuated, the operator manually actuates the valve 231 of the control valve assembly 230 to its actuated condition, thereby providing source air to the pilot of the valve 232 for actuating it, and providing source air therethrough to the valves 223, 224 and 229 and the pilots of the valves 222 and 218. This holds the valve 222 in its condition illustrated in FIG. 10, and shifts the valve 218 to an actuated condition for providing the low pressure source air from the regulator 215 and valve 214 to the rod end of the cylinder 75, and connecting the piston end thereof to exhaust, thereby slightly retracting the piston rod 76 for pulling the clamping plate 74 into a first clamping condition cooperating with the step 56 of the side window opening 55 to hold the marginal edge of the window cutout 27 on the blanks 25.

The source air applied to the valves 223, 224 and 229 is also applied to the pilots of those valves for holding them in their actuated conditions. When the valve 218 is actuated, the low pressure source air being fed therethrough is also applied to its pilot holding it actuated Thus, when the manually-operated valve 231 is released, the valve 218 stays actuated, even though the source air from the valve 229 has been removed therefrom. But it will also be noted that upon actuation of the valve 218, the low pressure source air being fed therethrough is removed from the pilot of the valve 229. Thus, when the manually-actuated valve 231 is released, and the source air is removed from the valves 223, 224 and 229 and the pilots thereof, there is no longer any air supplied to the pilot of the valve 229, so it shifts to its normal condition under the urging of its bias spring.

The operator then actuates the valve 231 a second time, again applying source air through the valve 232 and thence through the valves 223, 224 and 229, but since the condition of the valve 229 has been shifted, the source air is now fed therethrough to the pilot of the valve 217, for shifting it to its actuated condition. When thus shifted, the valve 217 supplies low pressure air to the rod end of the cylinder 75A and connects the piston end thereof to exhaust, for retracting the piston rod 76A and shifting the clamping plate 74A to its first clamping condition engaging the right-hand side of the blank 25 around the window cutout 27 thereof. This shifting of the valve 217 removes low pressure air from the pilot of the valve 224 so that, when the manually-operated valve 231 is released, and source air from the valve 232 is removed from the valve 224, the latter valve will return to its normal position under the operation of its bias spring.

The operator then operates the manually-operated valve 231 a third time, for again applying source air through the valves 223 and 224, but since the condition of the valve 224 has been shifted, the source air is now supplied therethrough to the pilot of the valve 216 for shifting it to its actuated condition and applying low pressure air to the rod ends of the cylinders 85, and connecting the piston ends thereof to exhaust. Thus, the piston rods 86 are retracted for moving the clamping plates 84 to their first clamping condition lightly engaging the blank 25 around the rear window cutout thereof. Upon shifting of the valve 216, the low pressure air is removed from the pilot of the valve 223, so that when the manually-actuated valve 231 is released, the valve 223 is shifted to its normal position under the urging of its bias spring.

Thus, it will be appreciated that by operating the control valve assembly 230 three consecutive times, the operator effects a sequential movement of the left-hand side clamp assembly 70, the right-hand side clamp assembly 75A and the rear clamp assembly 80 to their first clamping conditions. This specific sequence has been found to be critical to the proper fabrication of the rooftop covering 20. It will be noted that in their first clamping conditions, the clamp assemblies 70, 70A and 80 hold the blank 25 in the predetermined shape and orientation to which it has been pulled by the tension assemblies 90, and while they slightly depress the material into the window openings 55 they do not crimp or crease the material. It has been found to be essential that the material not be firmly crimped in these areas until the blank 25 has been heated and softened, in order to avoid creasing and wrinkling of the material and squeezing of adhesive therefrom. The slight retraction of the material as it is depressed into the window openings 55 is accommodated by the pneumatic cylinders 95 while maintaining the proper tension on the blank 25.

While the blanks 25 are being tensioned and after they have been clamped in their tensioned orientation and shape, heat from the heating assemblies 110 is transmitted through the rooftop form 50 and the cushioning sheet 22 to the thermosetting adhesive 23 of the blank 25 and, when this adhesive reaches a predetermined temperature, it sets. At this time the outer surface of the blank 25 will have reached some lesser temperature, such as 190 degrees F., depending upon the thickness of the decorative sheet 21 and the nature and color of the material thereof. The temperature controllers 264 and 265 are adjusted to respond at this temperature for deenergizing the heating assemblies 110 in the manner described above. For each type of blank 25 it will take a known time period, e.g., 3 minutes, for the adhesive 23 to reach its setting temperature. Shortly prior thereto the operator actuates the push-button valve 214, thereby to provide high pressure source air to the rod ends of the cylinders 75, 75A and 85 respectively through the valves 218, 217 and 216, to further retract the piston rods 76, 75A and 86 for moving the clamp assemblies 70, 70A and 80 to their second clamping conditions, firmly clamping the blanks 25 around the perimeters of the window cutouts 27 and permanently crimping the material to form marginal flanges around the window cutouts 27.

It will be noted that anytime after the clamp assemblies 75, 75A and 80 have been moved to their first clamping conditions to hold the blank 25, the tension assemblies 90 can be released. This is preferably done immediately so that the gripping mechanisms 100 can be disconnected while the held blanks 25 are being heated to the setting temperature. Thus, the tension control valve 203 is pulled back up to its first detent position, thereby permitting all of the valves 205 to return to their normal conditions for again extending the piston rods 96 of the tension cylinders 95 and relaxing the tension assemblies 90. This return of the tension control valve 203 to its original condition also reapplies source air to the pilot of the valve 208 for reactuating it and reconnecting the pilot of the valve 222 to those of the valves 214 and 223.

When the setting temperature is reached, the heating assemblies 110 will remain de-energized for a predetermined time period. During that time period the clamped blanks 25 cure on the machine 30. The blanks 25 are then released from the machine 30. More specifically, the operator again depresses the push-button valve 231 for applying source air to the valve 223, but since this latter valve is now in its normal position, the source air is fed therethrough to the pilot of the valve 214, for resetting it to its original low pressure condition, and through the valve 208 to the pilot of the valve 222 for shifting it to a release condition, in which source air is fed therethrough to the remote pilots 219, 220, 221 and 228, respectively to shift the valves 216, 217 and 218 to their normal conditions for releasing the clamp assemblies 80, 70A and 70 and to shift the valve 227, thereby retracting the hold-down assembly 60 to its fully-open position. It will be noted that the source air being fed through the valve 223 is also fed to the pilot thereof for holding it actuated as long as the push-button valve 231 is held down. But as soon as the push-button valve 231 is released, the valve 223 returns to its original condition under the action of the low pressure air which has been again applied to its other pilot through the valve 216. In like manner, the valves 224 and 229 have been returned to their original conditions by the application of low pressure air to the pilots thereof through the valves 217 and 218.

With all of the mechanisms now released, the clamp assemblies 70, 70A and 80 are manually unlatched and returned to their open positions. The removal fixture 120 is then moved into position and lowered over the machine 30 and the valve 237 is actuated for connecting the vacuum pump 238 to the suction mechanisms 135 for sucking the completed blanks 25 up into the cradle 130 of the removal fixture 120. This removal of the completed blanks 25 from the machine 30 can be facilitated by directing small jets of air between the rooftop form 50 and the blanks 25 by suitable means (not shown), these airstreams also serving to facilitate cooling of the completed blanks 25. The removal fixture 120 is then raised, moved to the discharge station and lowered and inverted and the excess marginal material of the finished blanks 25 is trimmed, with the cradle 130 serving as a guide for the trimming operation. Preferably, during trimming, a stream of cooling air is directed onto the blanks 25 in the cradle 130 to accelerate cooling thereof. This cooling is desirable since when the blanks 25 are initially removed from the machine 30, they are quite hot and, therefore, relatively soft and flexible, even though the thermosetting adhesive 23 has set. But after cooling, the finished rooftop coverings 20 are semirigid and can be easily lifted from the cradle 130 and stacked for storage. The rooftop coverings 20 will not be susceptible to the shrinking and expansion under temperature extremes experienced by existing rooftop coverings.

As soon as the completed rooftop coverings 20 have been removed from the machine 30, two new blanks 25 are applied thereto and the machine 30 is placed in condition for another cycle of operation, the heating assemblies 110 having automatically been re-energized at the expiration of the predetermined time period. It will be understood that the completed blanks 25 could also be manually removed from the machine 30 and placed in the trimming cradles 130.

As indicated above, the machine 30 may be utilized to form a wide variety of styles of rooftop covering for different automobile models. It is a significant feature of the present invention that changeover from one model to another can be speedily effected because of the fact that the support frame 40 is adapted for removal as a unit, together with all of the components mounted thereon, from the framework 35. Thus, when it is desired to shift to a different model, the support frame 40, together with the rooftop form 50, the holddown assemblies 60 and the clamp assemblies 70, 70A and 80 thereon is removed and there is substituted therefor a new unit. In this regard, it will be noted that the beams 41 and cross members 42 of the support frame 40 are hollow and form a part of the pneumatic control system, the coupler 235 mounted thereon affording rapid connection to and disconnection from the control consoles 150. Alternatively, the clamp assemblies could be mounted on the rooftop form 50 so that model changes could be effected by simply replacing the form and adjusting the positions of the heating assemblies 110. When a full rooftop form is utilized on the support frame 40, the clamp assemblies 80 will respectively be front and rear window assemblies, and there will typically be only one of the side clamp assemblies 70 and 70A on each side of the unit. Thus, the same pneumatic control circuit 200 can be used with a full top form, the front and rear clamp assemblies both being connected to the valve 216. In this arrangement, only six of the tension assemblies 90 are utilized, their positions being shifted on the deck 34 to achieve the desired tension distribution so that only one of the pneumatic control circuits 200 need be used. Also, in the full top arrangement there is no metal band 57 and pins 58 and the hold-down assemblies 60 are unnecessary for holddown purposes, but one is still used in order to position the temperature sensor 68.

Another advantage of the removability of the support frame 40 as a unit is that it facilitates use of a number of such support frame units in a carrousel-type system like that disclosed in FIG. 6 of the parent application Ser. No. 909,395 now abandoned. In that type of system, each of the support frames 40 would be mounted on suitable rails to accommodate radial sliding movement of the unit inwardly and outwardly of the circular path of the carrousel arrangement.

While the invention has been disclosed for use with materials blanks 25 which, after preforming, are then glued onto the rooftop of an automobile on the production assembly line by the use of suitable adhesives such as those used in the existing production techniques, another feature of this invention is the provision of a modified composite material blank 25A. As described above, the material blank 25A has a pressure-sensitive adhesive 24 applied to the cushioning sheet 22, and covered by a release liner 28. By the use of this modified material, the finished rooftop covering 20 can be directly adhered to the automobile rooftop after simply removing the release liner 28, without the necessity for on-line application of adhesive to the automobile rooftop and/or the rooftop covering 20, thereby greatly facilitating and speeding the assembly process. The adhesive 24 may be formulated to be unaffected by the temperatures required for setting the thermosetting adhesive 23, or it may be formulated to be activated to and set in its adhesive state by high temperatures.

From the foregoing, it can be seen that there has been provided an improved apparatus and method for preforming automobile rooftop coverings in a simple, economical and labor-saving manner. More particularly, there has been provided an improved method and apparatus for preforming semirigid rooftop coverings which can be installed on an automobile without any on-line fitting or trimming While there have been described what are at present considered to be the preferred embodiments of the invention, it will be understood that various modifications may be made therein, and it is intended to cover in the appended claims all such modifications as fall within the true spirit and scope of the invention.

What is claimed is:

1. Apparatus for applying and shaping on a form a prefabricated material including a thermosetting composition, said apparatus comprising means for tensioning the associated material on the form to a predetermined orientation and shape, heating means disposed for heating the associated material on the form to a predetermined temperature sufficient to insure setting of the thermosetting composition and the material in the predetermined shape, sensing means disposed closely adjacent to the prefabricated material for detecting the temperature thereof while it is on the form, and control means coupled to said sensing means and to said heating means and responsive to said sensing means for de-energizing said heating means when the prefabricated material has reached said predetermined temperature.

2. The apparatus of claim 1, wherein said sensing means is disposed out of contact with the associated prefabricated material on the form.

3. The apparatus of claim 1, wherein said control means includes means for varying the predetermined temperature at which said heating means will be de-energized.

4. The apparatus of claim 1, wherein said control means includes timing means for automatically re-energizing said heating means after a predetermined time period.

5. The apparatus of claim 1, wherein said heating means is disposed on the opposite side of the form from the predetermined material.

6. The apparatus of claim 1, wherein said means for tensioning includes gripping means for engaging the associated material at spaced-apart gripping locations thereon while it is on the associated form, fluid-actuated power means coupled to said gripping means for effecting movement thereof to apply a tensioning force to the associated material, and control means coupled to said power means for controlling the tensioning force applied to the associated material at each of said gripping locations, said power means being so arranged and oriented as to be in equilibrium when the material has attained the predetermined orientation and shape on the form.

7. Apparatus for applying and shaping a prefabricated material on a form, said apparatus comprising means for tensioning the associated material on the form to a predetermined orientation and shape, and clamping means associated with the form and movable among an open condition out of engagement with the associated material and first and second clamping conditions, said clamping means in the first clamping condition thereof lightly engaging the associated material on the form with a force sufficient securely to hold the prefabricated material in its predetermined orientation and shape but insufficient permanently to crease the prefabricated material, said clamping means in the second clamping condition thereof tightly engaging the associated material on the form with a force sufficient permanently to crease the prefabricated material to form marginal flanges thereon.

8. The apparatus of claim 7, and further including drive means coupled to said clamping means for effecting movement thereof between the first and second clamping conditions thereof.

9. The apparatus of claim 7, and further including latch means coupled to said clamping means and operable in the clamping conditions thereof to prevent movement of said clamping means to the open condition thereof.

10. The apparatus of claim 9, and further including drive means coupled to said clamping means for effecting movement thereof between the first and second clamping conditions thereof.

11. The apparatus of claim 7, wherein said clamping means includes two clamping members respectively diposed at opposite sides of the form, and further including drive means coupled to each of said clamping members for effecting movement thereof in a predetermined sequence to the first clamping condition thereof.

12. The apparatus of claim 11, wherein said clamping means further includes a clamping member disposed at one end of the form, said drive means including means coupled to said end clamping member and being operative for effecting movement thereof to the first clamping condition thereof subsequent to the movement of said side clamping members to the first clamping condition thereof.

13. The apparatus of claim 7, wherein said clamping means includes a clamping member movable between an open position and first and second clamping positions, a fluid-actuated cylinder mounted on said clamping member and movable therewith, a piston rod coupled to and movable with respect to said cylinder, and latch means carried by said piston rod at the distal end thereof and engageable with the associated form when said clamping member is in the clamping positions thereof for preventing movement of said clamping member to the open position thereof, movement of said piston rod with respect to said cylinder effecting movement of said clamping member between the first and second clamping positions thereof.

14. The apparatus of claim 7, wherein said means for tensioning includes gripping means for engaging the associated material at spaced-apart gripping locations thereon while it is on the associated form, fluid-actuated power means coupled to said gripping means for effecting movement thereof to apply a tensioning force to the associated material, and control means coupled to said power means for controlling the tensioning force applied to the associated material at each of said gripping locations, said power means being so arranged and oriented as to be in equilibrium when the material has attained the predetermined orientation and shape on the form and to remain in equilibrium while accommodating displacement of the material by movement of said clamping members to the first clamping positions thereof.

15. Apparatus for applying and shaping on a form a prefabricated material including a thermosetting composition, said apparatus comprising means for tensioning the associated material on the form to a predetermined orientation and shape, heating means disposed for heating the associated material on the form to a predetermined temperature sufficient to insure setting of the thermosetting composition and the material in the predetermined shape, sensing means disposed closely adjacent to the prefabricated material for detecting the temperature thereof while it is on the form, control means coupled to said sensing means and to said heating means and responsive to said sensing means for de-energizing said heating means when the prefabricated material has reached said predetermined temperature, and clamping means associated with the form and movable among an open condition out of engagement with the associated material and first and second clamping conditions, said clamping means in the first clamping condition thereof lightly engaging the associated material on the form with a force sufficient securely to hold the prefabricated material in its predetermined orientation and shape but insufficient permanently to crease the prefabricated material, said clamping means in the second clamping condition thereof tightly engaging the associated material on the form with a force sufficient permanently to crease the prefabricated material to form marginal flanges thereon.

16. The apparatus of claim 15, and further including drive means coupled to said clamping means for effecting movement thereof between the first and second clamping conditions thereof.

17. The apparatus of claim 16, wherein said control means includes timing means for automatically re-energizing said heating means after a predetermined time period, and means for relaxing said tensioning means and for releasing said clamping means from the clamping conditions thereof.

18. The apparatus of claim 15, wherein said clamping means includes two clamping members respectively disposed at opposite sides of the form, and further including drive means coupled to each of said clamping members for effecting movement thereof in a predetermined sequence to the first clamping condition thereof.

19. A system for applying and shaping on a form a flexible prefabricated material including a thermosetting composition, said system comprising a plurality of forms mounted at spaced-apart locations and each adapted for receiving thereon associated flexible prefabricated material, means associated with each of said forms for tensioning the prefabricated material thereon to a predetermined orientation and shape, heating means disposed for heating the prefabricated material on each of said forms to a predetermined temperature sufficient to insure setting of the thermosetting composition and the material in the predetermined shape, and discharge means movable among each of said forms and a discharge station for moving the shaped material from each said form to the discharge station while maintaining the predetermined shape thereof.

20. The system of claim 19, wherein said discharge means includes vacuum suction means for lifting the shaped material from said forms.

21. The system of claim 19, wherein said discharge means includes a carrier for receiving and holding the shaped material in its predetermined shape, and guide means on said carrier to guide the trimming of excess material from the shaped material.

22. The system of claim 21, wherein said discharge means includes vacuum suction means, and means for effecting movement of said carrier between pickup positions respectively overlying the forms for lifting the shaped material from the forms by operation of said suction means and a discharge position at the discharge station for holding the shaped material in position for trimming.

* * * * *